(No Model.)
E. W. MERSEREAU.
PAN.
No. 383,652. Patented May 29, 1888.
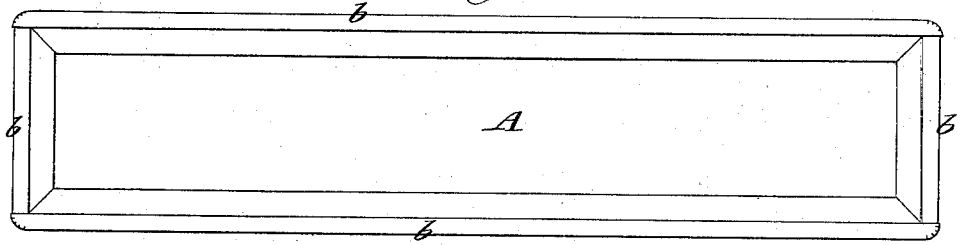
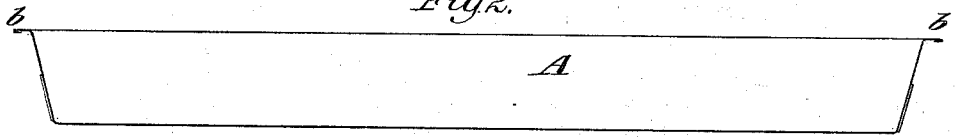
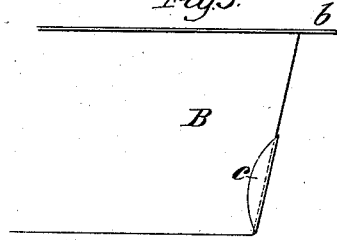 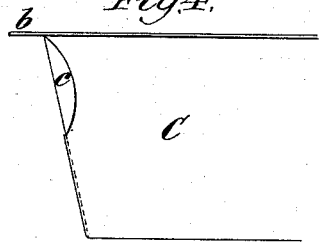
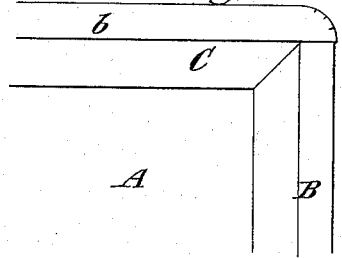 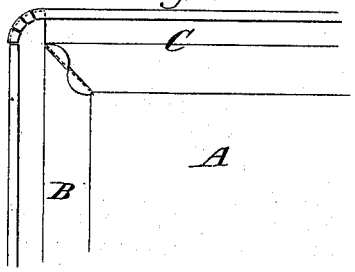
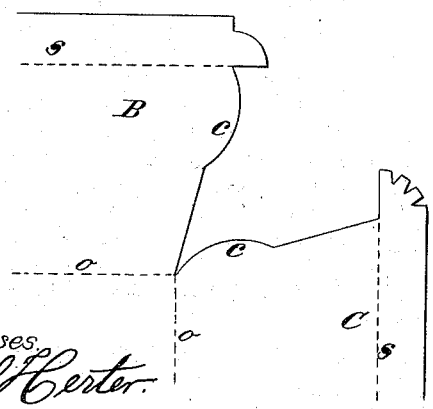
Witnesses
Emil Herter.
C. Lundgren.
Inventor
Edgar W. Mersereau
by his Atty
Brown & Hall

UNITED STATES PATENT OFFICE.

EDGAR W. MERSEREAU, OF BROOKLYN, NEW YORK.

PAN.

SPECIFICATION forming part of Letters Patent No. 383,652, dated May 29, 1888.

Application filed May 11, 1887. Serial No. 237,809. (No model.)

*To all whom it may concern:*

Be it known that I, EDGAR W. MERSEREAU, of Brooklyn, in the county of Kings and State of New York, have invented a new and useful Improvement in Pans, of which the following is a specification.

My invention relates more particularly to pans which have laterally-extending flanges at the upper edge, and which are made of decorated tin, so commonly used, in which solder cannot be employed, because the heat produced would impair or mar the lithographic or other decorations.

The object of the invention is to provide a very simple and inexpensive means of uniting the side walls at the corners or angles; and the invention consists in a pan having a laterally-projecting flange formed by portions overlapping at the corners, and having at the unsoldered corners of its walls a lip or projection on each wall bent over the adjacent and meeting wall, whereby the walls of the pan are held in proper position relatively to each other.

In the accompanying drawings, Figure 1 is a plan of a pan, and Fig. 2 is a sectional elevation thereof, embodying my invention. Figs. 3 and 4 represent elevations of one corner of the pan, looking from points of view at right angles to each other, so as to show two side walls, which together make the corner. Figs. 5 and 6 are respectively an enlarged plan and an enlarged inverted plan of one corner portion of the pan. Fig. 7 represents one corner portion of the blank, showing how the same may be formed.

Similar letters of reference designate corresponding parts in all the figures.

The pan A (shown in Figs. 1 and 2) has its length very much greater than its width. As here represented, the pan has a laterally-projecting flange, $b$, which extends around its entire perimeter, and the method of forming the corners can be best understood from Figs. 3, 4, and 7, but is also shown in the other figures.

The two side walls which combine to form each corner each have lips or projections $c$, which are lapped over the other side wall, as best represented in Figs. 3 and 4. One wall, either the side or end, B, may have at its upper portion a lip or projection $c$, which is folded or bent over the adjacent wall, either the side or end, C, which combines with the wall B to form the corner, and the wall C likewise has at its lower portion a lip or projection $c$, which is folded in like manner on the outside of the wall B. This is best represented in Fig. 7, which shows a portion of the blank as cut for bending into proper shape.

B C designate portions which, when bent up upon the lines $o$, will form two adjacent side walls, and each of these portions B C is constructed with a lip or projection $c$, each lip or projection being adapted, when the blank is bent upon the lines $o$ and when the lip or projection is bent at right angles to the portion B or C, to overlap either wall which contributes to form the corner. The blank is bent upon the lines $s$ to form the rim or flange $b$, and the portions outside of these lines overlap and are bent one upon the other, as best shown in Fig. 6, in order to complete and lock the corner.

It will be observed that Figs. 3, 4, 5, 6, and 7 are upon a very much larger scale than Figs. 1 and 2, which is practicable, inasmuch as they represent only a small portion of the pan illustrated in its entirety in Figs. 1 and 2.

What I claim as my invention, and desire to secure by Letters Patent, is—

The pan herein described, having a laterally-projecting flange at its upper edge formed by portions overlapping at the corners, and having at the unsoldered corners of its walls a lip or projection on each wall bent over the adjacent and meeting wall, substantially as herein set forth.

E. W. MERSEREAU.

Witnesses:
C. HALL,
FREDK. HAYNES.